(12) United States Patent
Nair et al.

(10) Patent No.: US 8,813,046 B2
(45) Date of Patent: Aug. 19, 2014

(54) SYSTEM AND METHOD FOR INTERNATIONALIZATION ENCODING

(75) Inventors: Suraj Nair, Bangalore (IN); Krishna Markande, Bangalore (IN); Aviraj Singh, Navi Mumbai (IN)

(73) Assignee: Infosys Limited, Bangalore (IN)

( * ) Notice: Subject to any disclaimer, the term of this patent is extended or adjusted under 35 U.S.C. 154(b) by 16 days.

(21) Appl. No.: 13/529,358

(22) Filed: Jun. 21, 2012

(65) Prior Publication Data

US 2013/0254752 A1    Sep. 26, 2013

(30) Foreign Application Priority Data

Mar. 23, 2012   (IN) .......................... 1076/CHE/2012

(51) Int. Cl.

| | |
|---|---|
| G06F 17/20 | (2006.01) |
| G10L 21/00 | (2013.01) |
| G06F 17/00 | (2006.01) |
| G06F 15/16 | (2006.01) |
| G06F 17/25 | (2006.01) |
| G06F 9/44 | (2006.01) |
| G06F 9/45 | (2006.01) |
| G06T 11/00 | (2006.01) |

(52) U.S. Cl.
USPC ............. 717/137; 704/8; 704/270; 706/46; 709/245; 715/263; 717/106; 717/126; 717/130; 717/136; 345/467

(58) Field of Classification Search
None
See application file for complete search history.

(56) References Cited

U.S. PATENT DOCUMENTS

| | | | |
|---|---|---|---|
| 5,784,069 A * | 7/1998 | Daniels et al. | 345/467 |
| 5,784,071 A * | 7/1998 | Tang et al. | 345/467 |
| 6,400,287 B1 * | 6/2002 | Ehrman | 341/55 |
| 6,757,688 B1 * | 6/2004 | Leapaldt et al. | 1/1 |
| 6,983,238 B2 * | 1/2006 | Gao | 704/8 |
| 7,278,100 B1 * | 10/2007 | Ehrman | 715/264 |
| 7,389,474 B2 * | 6/2008 | Rettig et al. | 715/263 |
| 8,447,586 B2 * | 5/2013 | Aoyama et al. | 704/270 |
| 2002/0054097 A1 * | 5/2002 | Hetherington et al. | 345/762 |
| 2002/0162093 A1 * | 10/2002 | Zhou et al. | 717/130 |
| 2003/0208743 A1 * | 11/2003 | Chong et al. | 717/106 |
| 2004/0044791 A1 * | 3/2004 | Pouzzner | 709/245 |
| 2006/0005127 A1 * | 1/2006 | Ferguson et al. | 715/522 |
| 2006/0288281 A1 * | 12/2006 | Merz et al. | 715/531 |
| 2007/0028221 A1 * | 2/2007 | Ukelson et al. | 717/136 |

(Continued)

OTHER PUBLICATIONS

Wenlin Peng, Xiaohu Yang, and Feng Zhu. 2009. Automation technique of software internationalization and localization based on lexical analysis. In Proceedings of the 2nd International Conference on Interaction Sciences: Information Technology, Culture and Human (ICIS '09). ACM, New York, NY, USA, 970-975.*

*Primary Examiner* — Don Wong
*Assistant Examiner* — Anibal Rivera
(74) *Attorney, Agent, or Firm* — Marc S. Kaufman; Stephen M. Hertzler; Reed Smith LLP

(57) ABSTRACT

A system and computer-implemented method for transforming source code in an original natively encoded format to a locale neutral format, wherein data types and functions in the original format are estimated for compliance with the locale neutral format and an estimation is made as to the amount of code conversions necessary to comply with the locale neutral format. In addition, image files referenced by the source code is analyzed and embedded text extracted for enabling translation during the localization process.

21 Claims, 6 Drawing Sheets

(56) References Cited

U.S. PATENT DOCUMENTS

| | | |
|---|---|---|
| 2007/0112714 A1* | 5/2007 | Fairweather .................... 706/46 |
| 2007/0239865 A1* | 10/2007 | Tout .............................. 709/223 |
| 2008/0317347 A1* | 12/2008 | Lim et al. ...................... 382/182 |
| 2009/0110279 A1* | 4/2009 | Jain et al. ...................... 382/176 |
| 2009/0217245 A1* | 8/2009 | Iyer et al. ...................... 717/126 |
| 2010/0211377 A1* | 8/2010 | Aoyama et al. .................... 704/8 |
| 2011/0153653 A1* | 6/2011 | King et al. .................... 707/769 |
| 2013/0152045 A1* | 6/2013 | Jain et al. ...................... 717/120 |

* cited by examiner

SYSTEM AND METHOD FOR INTERNATIONALIZATION ENCODING

RELATED APPLICATION DATA

This application claims priority to India Patent Application No. 1076/CHE/2012, filed Mar. 23, 2012, the entire disclosure of which is hereby incorporated herein by reference in its entirety.

BACKGROUND

The development of globalized software requires that software written for users in a particular locale be adapted for use by other users in different locales. This area of software development is known as internationalization, or "I18N". The inverse of the internationalization process is localization, or "L10N", where software is adapted to specific languages and may incorporate regional differences, e.g., American English versus U.K. English, as well as technical requirements belonging to the target locale. Internationalization of software includes addressing generic coding and design issues that would otherwise hamper the localizability of a particular piece or set of software and implementing features and code design that is not based on a single language or locale.

The software may instead implement a universal encoding scheme, e.g., Unicode, that can accommodate character sets encompassing all of the languages and scripts in the world. That is, truly internationalized source code is source code which allows for the creation of applications that can operate in more than one language or locale at a time without significant modification or additional effort. Further, the character/text data being processed in the source code and the applications should be in a neutral encoding format regardless of the language or locale environment in which the software was developed or in which it is to be deployed.

DETAILED DESCRIPTION

Figure 1:
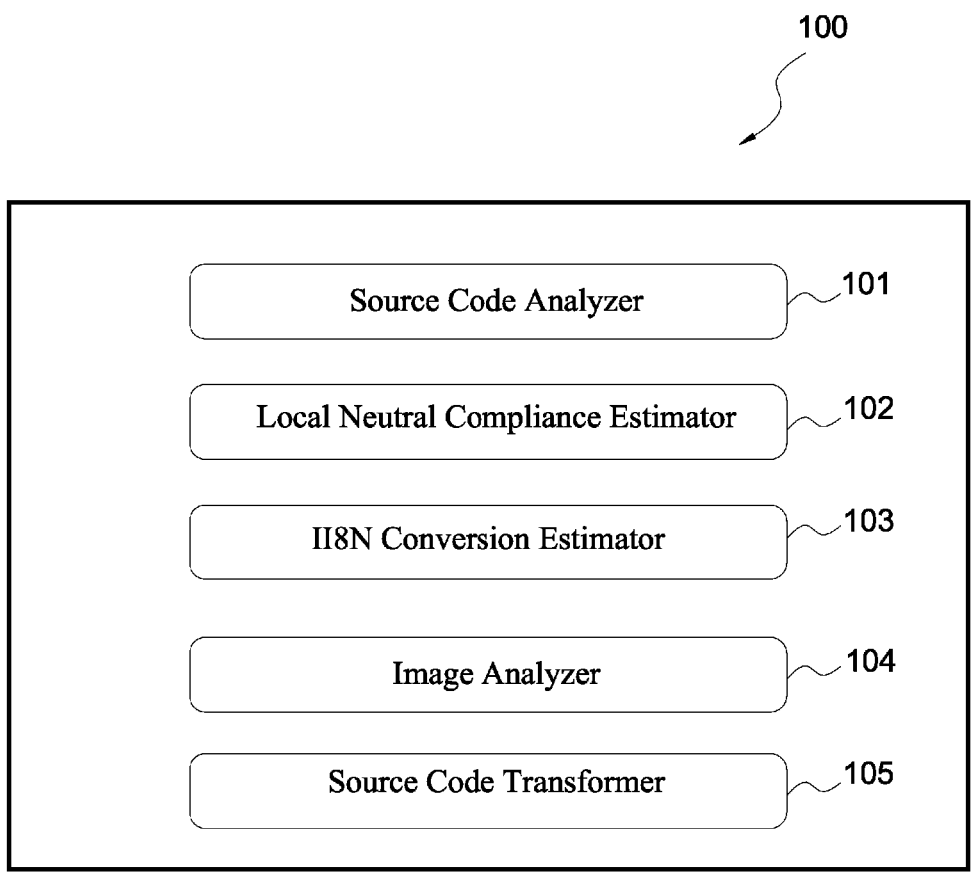
FIG. 1 is a schematic block diagram of an exemplary system that may detect common problems, provide conversions and/or maintain a data store.

There is a need in the art for an efficient and internationalization aware encoding methodology for converting source code in an original format to an internationalized format, wherein the internationalized format corresponds to I18N industry standards. As source code (legacy) may be developed for specific system locales, programming structures (date types and functions) that are required for only those specific system locales may be infused into developed source code. That is, for example, data types or functions may work correctly only for encoding formats corresponding to a set of specific code page selections in a specific Windows environment or the designated locale encoding in a Unix environment. Such programming styles do not guarantee that the same code base will work correctly when executed in a system locale different than the specific locale that it has been developed for. These variances in the development environment present several challenges to internationalization.

For example, when the data type used to store strings is char[ ] or strings, the encoding of data stored in those data types is based on the code page selection (system locale selection) or designated locale encoding format, as discussed above. Further, when the data type used to store the strings is wchar[ ], the wide character data type, or wstrings (UNICODE), the encoding of data stored in those variables is UTF-16/UCS-2 in Windows environments, and, typically, UTF-32 in Unix environments. The operating system's APIs and system calls are generally based upon the base encoding format of the relevant operating system; that is, whereas the base encoding format of Windows environments is understood to be UTF-16, the base encoding format of Unix-type environments is typically UTF-8.

It is desirable, therefore, to improve the performance of system and API calls by using the same encoding format as the relevant operating system. UNICODE, as appreciated by those skilled in the art, is a relatively new standard for internationalized data types. As such, there is a vast library of source code and applications that have been developed in, for example, C/C++ code that is limited by the encoding format being utilized in the user's specific locale or the environment's specific code page selection (i.e. legacy source code).

A further hurdle present in the prior art is that, for example, in the Windows environment, representing data which is normally in the ASCII/ANSI range of characters in the encoding of the operating system (UTF-16) will require the use of wide data types (wchar_t). As is appreciated by those skilled in the art, wchar_t utilizes two bytes for storing data, which may otherwise be represented by a single byte. This implementation is considered by those skilled in the art as a negative use of the available memory and, therefore, much of the non-internationalized code continues to implement char[ ]/string type data types as they work only on the ASCII/ANSI range of characters and data. UTF-8, for example, is an encoding scheme that economizes on the amount of memory required to store characters in the ASCII/ANSI range, but provides a penalty because UTF-8 is not the base encoding scheme of the Windows Operating System.

Accordingly, it is desirable to have a system and method that selects the best neutral base encoding format that is backed by corresponding APIs and is sufficiently flexible to behave correctly without regard to the user's selected locale. These considerations, as is to be appreciated by those skilled in the art, include determining the presence of libraries in the determined encoding format to perform string processing (e.g. ICU for UTF-8, Windows APIs for UTF-16); incorporating flexibility for adopting third-party libraries (e.g. commercial, open source) for string processing in specific encodings or limiting the use of OS-based APIs; optimizing processing overhead due to encoding conversions to an target encoding format; leveraging data types and functions/APIs in order to receive the best performance from OS system calls and APIs; accounting for data storage and performance overhead caused by the conversion; as well as the current state of the non-internationalized code, i.e., legacy code, in terms of the data types and APIs currently implemented and the tradeoff considerations (e.g. complexity, maintainability and performance) when implementing the target encoding format's data types (either third-party or OS-specific) and maintaining legacy data types/APIs to the extent possible.

Various embodiments of the present invention will be described in detail with reference to the drawings. Reference to various embodiments does not limit the scope of the invention, which is limited only by scope of claims attached hereto. Additionally, any examples set forth in this specification are not intended to be limiting and merely set forth some of the many possible embodiments. Also, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items.

The disclosed embodiments are a system and method for statically processing source code based upon a set of configurable rules to identify internationalization incompatibilities and to perform the transformation of source code in an original format to a target format that corresponds to an internationalized standard. As is to be appreciated by those skilled in the art, Unicode provides multiple encoding formats, i.e., UTF-8, UTF-16 and UTF-32. Each of these Unicode encoding formats is desirable in certain contexts and undesirable in others (either due to system performance or maintainability). For example, on Unix systems, UTF-8 is often the preferred encoding format for text representation, whereas UTF-16 is preferred on Windows systems.

FIG. 1 depicts an overall view 100 of an embodiment. In an embodiment, the system 100 detects common problems such as hard coded strings, non-Unicode data types, APIs and provides conversions and maintains a data store representing code quality by way of statistical analysis from a character encoding view point. That is, by analyzing source code on the basis of data types holding character data, the system 100 determines the level of Unicode support already provided in the original source code. Further, additional statistical information is referenced in order to determine the target base character encoding scheme (UTF-8, UTF-16 and UTF-32) to be used to internationalize the source code.

For example, in the case of repeated character encoding conversions, a statistical indication is provided as to performance impact, which may be used in an embodiment to inform the target base character encoding scheme and libraries. In a further embodiment, it may be desirable to convert only those C runtime functions that do not support the target encoding format and replace them with third-party library functions and leave all other C runtime functions as-is. In yet another embodiment, statistical reports are provided to inform decisions as to the current state of I18N readiness and productivity, e.g., folder-level anomalies, performance factors to be considered in implementing system locale neutral data types. These reports may be provided in a manner or format that can be used to plan work allocation and improve development productivity. For example, the reports may be provided to a user via a display interface, a chart format, a tabular format or as a document output or any other means known in the art. In each case, features such as automatic replacement of incompatibilities with corresponding solutions are provided such that the system 100 provides an informed basis upon which anomaly replacement and encoding conversions may be executed, or, alternatively, incompatible code sections may be automatically flagged for further analysis before replacement.

In a further embodiment, the system 100 includes an image analyzer 104. As is to be appreciated by those skilled in the art, lines of source code may reference one or more external image files which are displayed to the end user of the application software. In such instances, the external image files will also be required to be analyzed for embedded text and extracted to enable translation and re-imaging as part of the process of future localization. In this embodiment, the locations of the image files, as referenced by the source code, are determined and the image(s) is/are analyzed.

The analysis of the image file may be by any means known in the art, including optical character recognition (OCR) techniques. The embedded text within the image and the image location, collectively, the image data, may be stored in a database, an extensible file or any other location or by any other means known in the art for storing data in memory for later retrieval. The image data may be retrieved or otherwise included for display in a report generated by the system 100. The functionality expressed in this embodiment enables developers to quickly identify dependent images for conversion to the international standard by way of determining and expressly identifying embedded text that is either locale-specific and otherwise not locale neutral in any manner. Alternatively, all or a portion of the images files and/or the image data may be flagged for further processing by a user.

Figure 2:
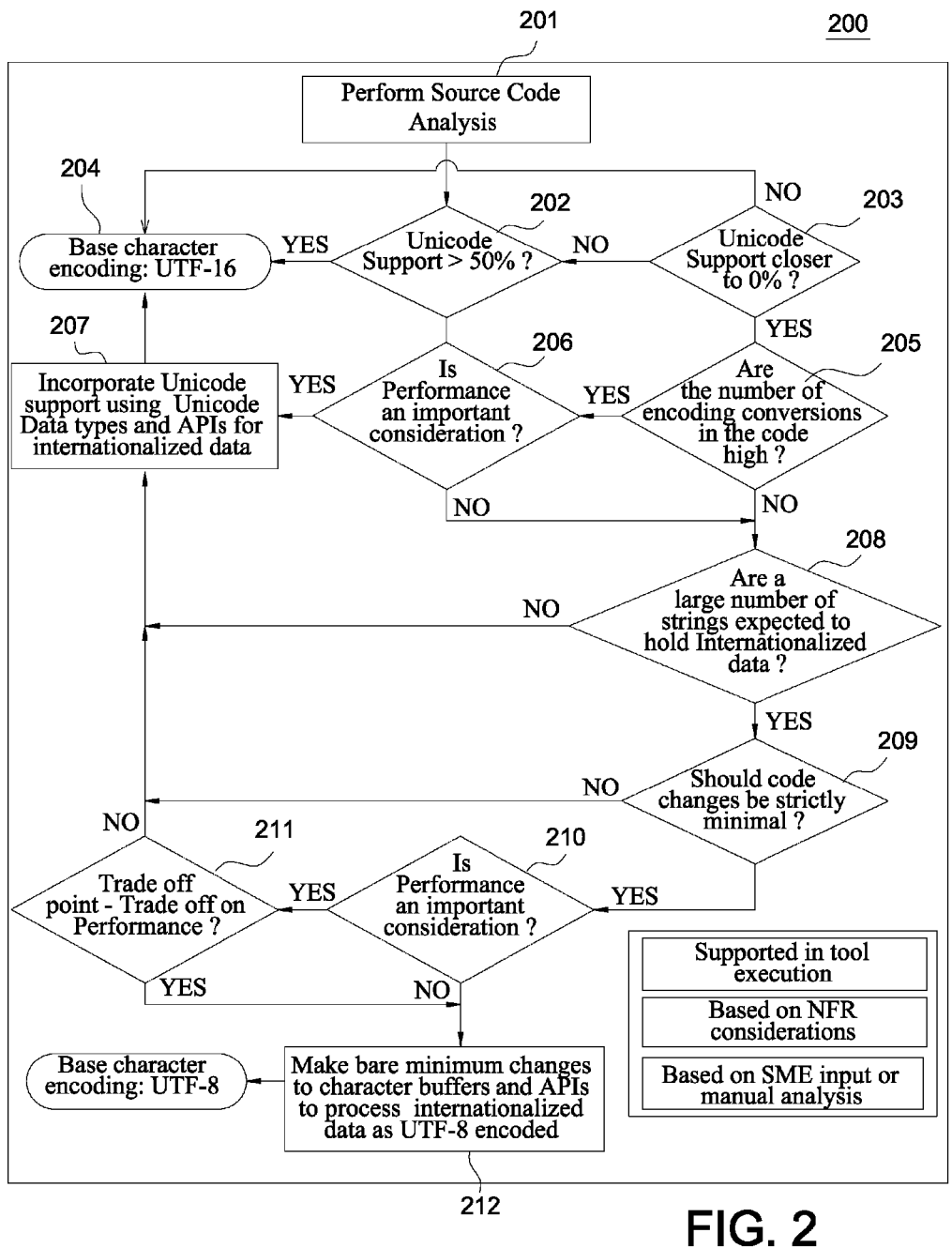
FIG. 2 is a functional flow block diagram of an exemplary system in a Windows environment.

Referring to FIG. 2, a further embodiment 200, in a Windows environment, may include a process flow that provides an estimation of both (or either) built-in locale neutral encoding and conversions required to transform source code in original format to a target format that is locale character encoding neutral. For example, at block 202, an estimation is made as to the level of locale neutral encoding support present in the original format source code. In order to maximize efficiency in the transformation process and to reduce overhead system performance, an election may be made as to whether to prefer broad expansion towards a neutral encoding format, or a minimum transformation towards another neutral encoding format. By way of non-limiting example, if the level of neutral encoding support is low, e.g., less than 50% of all lines of code considered, then it may be preferable to perform only a minimal number of transformations because the overhead that would be associated with such a significant number of required transformations. Accordingly, as depicted at blocks 203, 205, 209, 210 and 211, a bare minimum amount of transformations or conversions may be made so as to optimize system performance and reduce the delta, or level of change, between the original format of the source code and the target format.

In the instance depicted at block 211, the internationalization encoding format may be UTF-8 so as to require the least amount of physical change to the original format source code. Alternatively, the original format source code format may already have a high level of native neutral encoding support, and, in such instances, it may be desirable to take a more aggressive approach towards achieving an even higher level of neutral encoding compliance. For example, at block 204, the encoding format may be UTF-16 so as to have an increased level of neutral encoding compliance. The level of support, in all instances, may, however, be subject to the availability of processing resources to execute the transformation.

Figure 3:
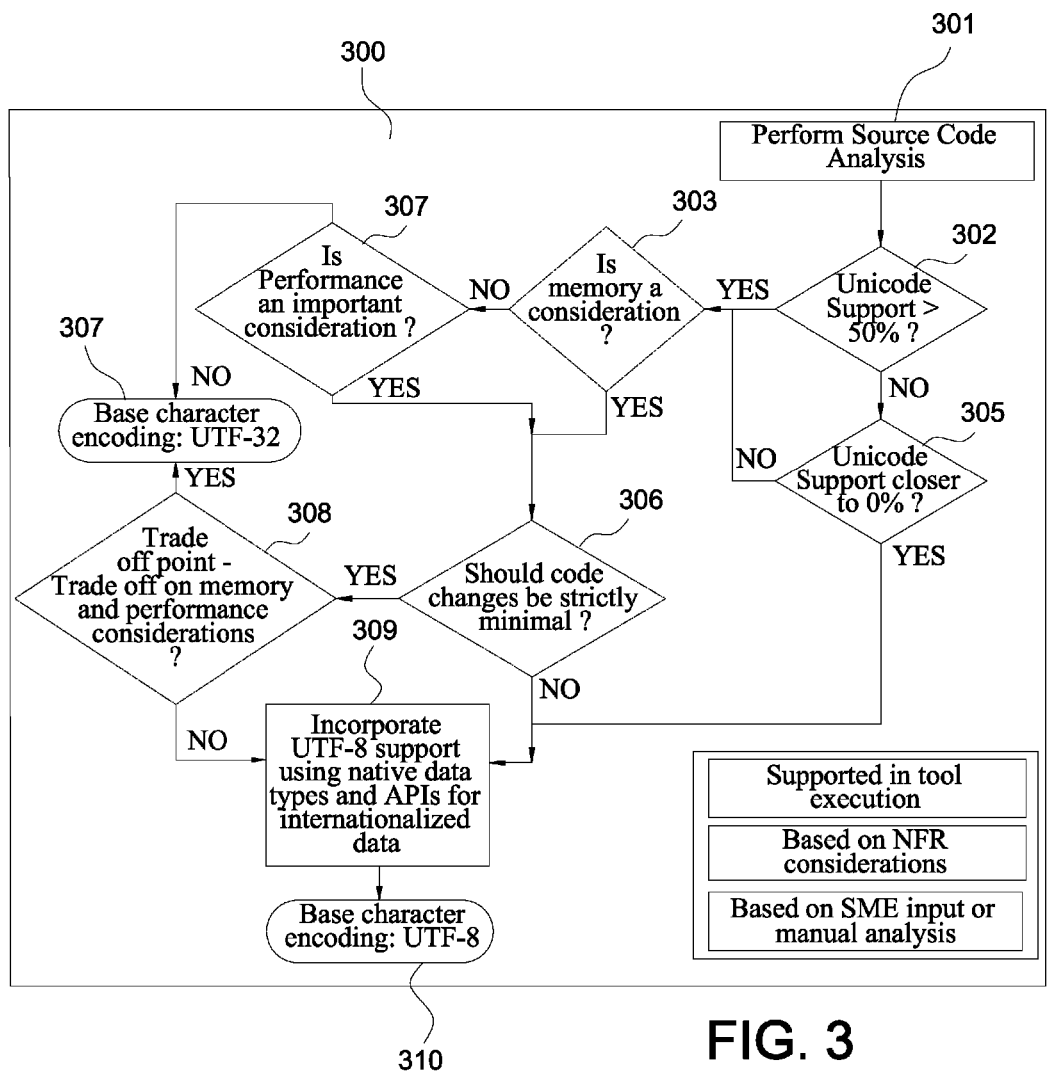
FIG. 3 is a functional flow block diagram of an exemplary system in a Unix-type environment.

Referring now to FIG. 3, a further embodiment 300, in a Unix-type environment, may incorporate UTF-32 for aggressive neutral encoding compliance, 307, and UTF-8 for less aggressive compliance, 310. In all scenarios, as is to be appreciated by those skilled in the art, there are inherent efficiencies to choosing various encoding schemas and performance trade-offs.

Figure 4:
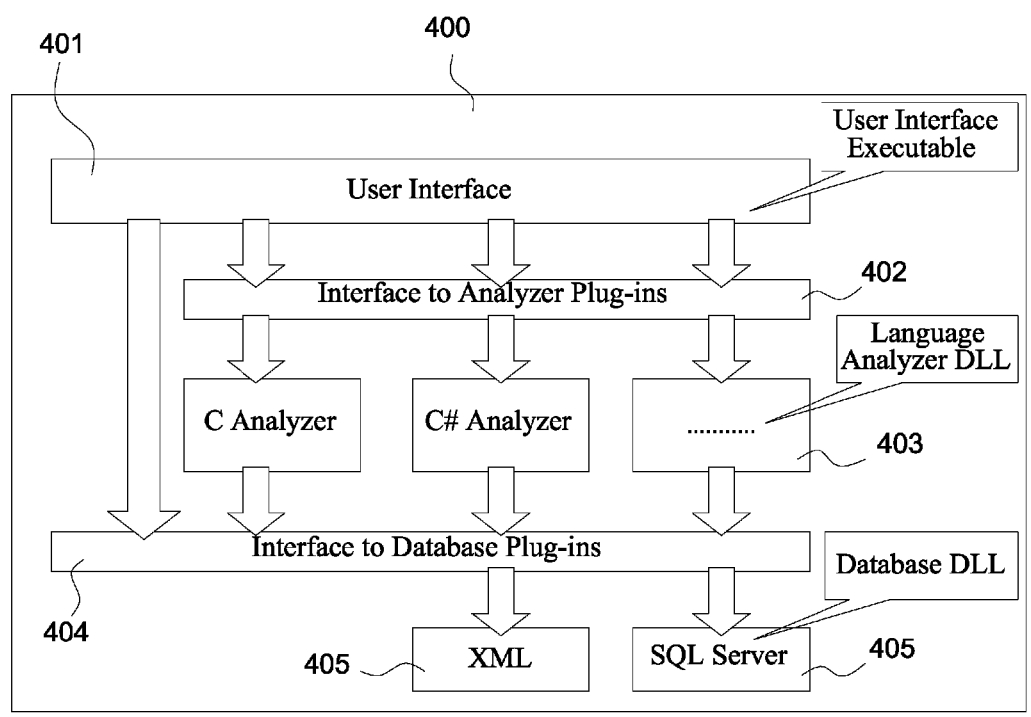
FIG. 4 is a functional flow block diagram of an exemplary system that may include one or more modules.

Referring to FIG. 4, a further embodiment 400, may include a user interface module 401, a software interface module 402, a language module 403, a database interface module 404 for interfacing with a database, memory or an extensible file format, and a database module 405 which may be a file store, a relational database or an extensible file format (e.g. XML). The user interface module 401 may be utilized by a software developer (or any other user) to input the one or more source code files in their original format, trigger static analysis of the source code files, display results and make subsequent automatic replacements. The software interface module 402 provides a base interface for actual implementations of static analysis of the original format source code based upon the code's programming language. A software language module 403 is provided which may feature a ruleset specific to each relevant language that is specially situated to identify locale-specific or non-neutral encoding for transformation. For example, the software language module 403 may include the logic necessary to parse and process C#, C++ or Java source file syntax, as is to be appreciated by one skilled in the art of the invention. A database module 405 is provided that may be used to store the results of the analysis and/or populate reports generated by a reporting module that provides estimations of the transformation process and the hit/miss rate of any transformations performed or failed to be performed. In an embodiment featuring an XML implementation, two configurations may be provided: (1) an XML configuration that contains a dynamically configurable rule set that is optimized to reduce unnecessary output, and (2) an XML configuration that enables the mapping of a detected anomaly to a potential replacements in each of the multiple Unicode encoding formats.

Figure 5:
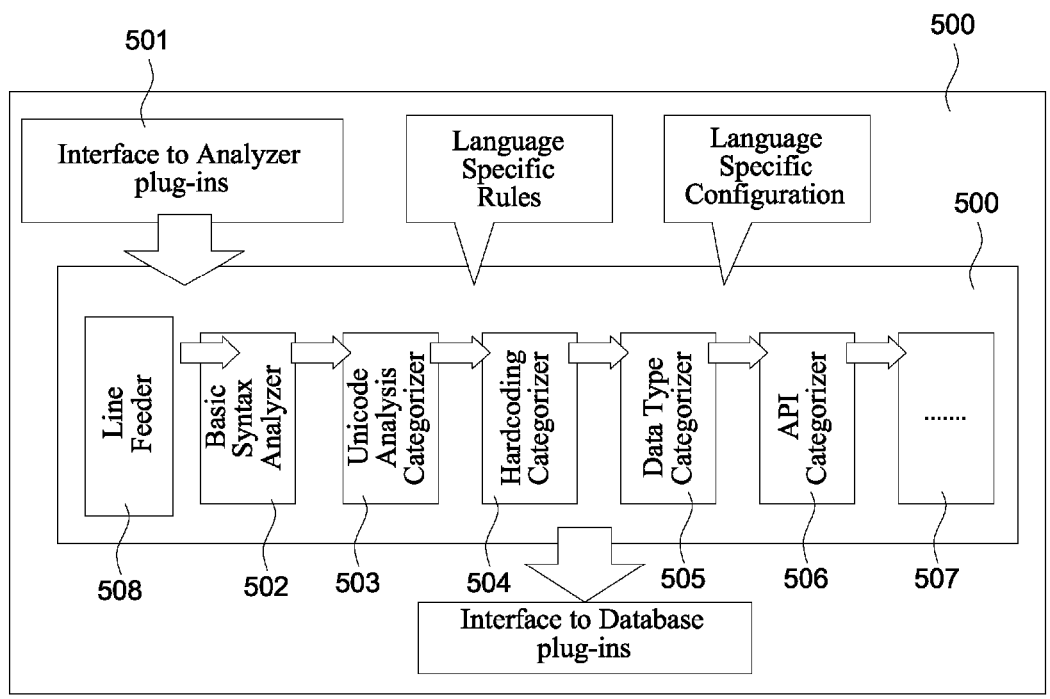
FIG. 5 is a functional flow block diagram of an exemplary system that may include a series of sub-modules collectively forming an analyze module.

Referring to FIG. 5, a further embodiment 500 may include a series of sub-modules collectively forming an analyzer module 500. By way of non-limiting example, the sub-modules may include, a Basic Syntax Analyzer 502, a Unicode Analysis Categorizer (or Neutral Encoding Format Categorizer) 503, a Hardcoding Categorizer 504, a Data Type Categorizer 505, an API Categorizer 506 and a Image Categorizer 507, as well as any other categorizers or sub-modules as may be relevant given the internationalization needs or requirements of the source code in the original format.

The Line Feeder 508 provides a mechanism to read each line of the source code in the original format and pass the data onto each subsequent sub-module. The Basic Syntax Analyzer 502 determines if the line of code being processed is a coder comment as per the target language (note, varying target languages or internationalization targets may require varying coder comment standards) and splits or combines coded statements into single logical statements, as appropriate, for further analysis. The Unicode Analysis Categorizer 503 determines the number of Unicode data types and non-Unicode data types holding character data in C/C++ applications (or other coded languages). This sub-module may provide statistics and estimations of the level of Unicode or locale neutral support present in the source code and may provide indicators as to the choice of an encoding format during the internationalization process. This sub-module may further detect character encoding transformations to indicate whether performance improvements are possible and/or achieved. The Hardcoding Categorizer 504 determines the presence of hardcoded strings in the line of code being processed. The Datatype Categorizer 505 determines whether there are character or data type declarations in the line of code being processed. The API Categorizer 506 determines whether there are functions or calls being utilized in the line of code being processed.

The Image Categorizer 507, as discussed above, determines whether there are image files referred to in the line of code being processed and provides image data to a database or other source, also as discussed above. The embodiment disclosed 500 may include any and all of the functionality and features disclosed in embodiment 200, 300 and 400.

Figure 6:
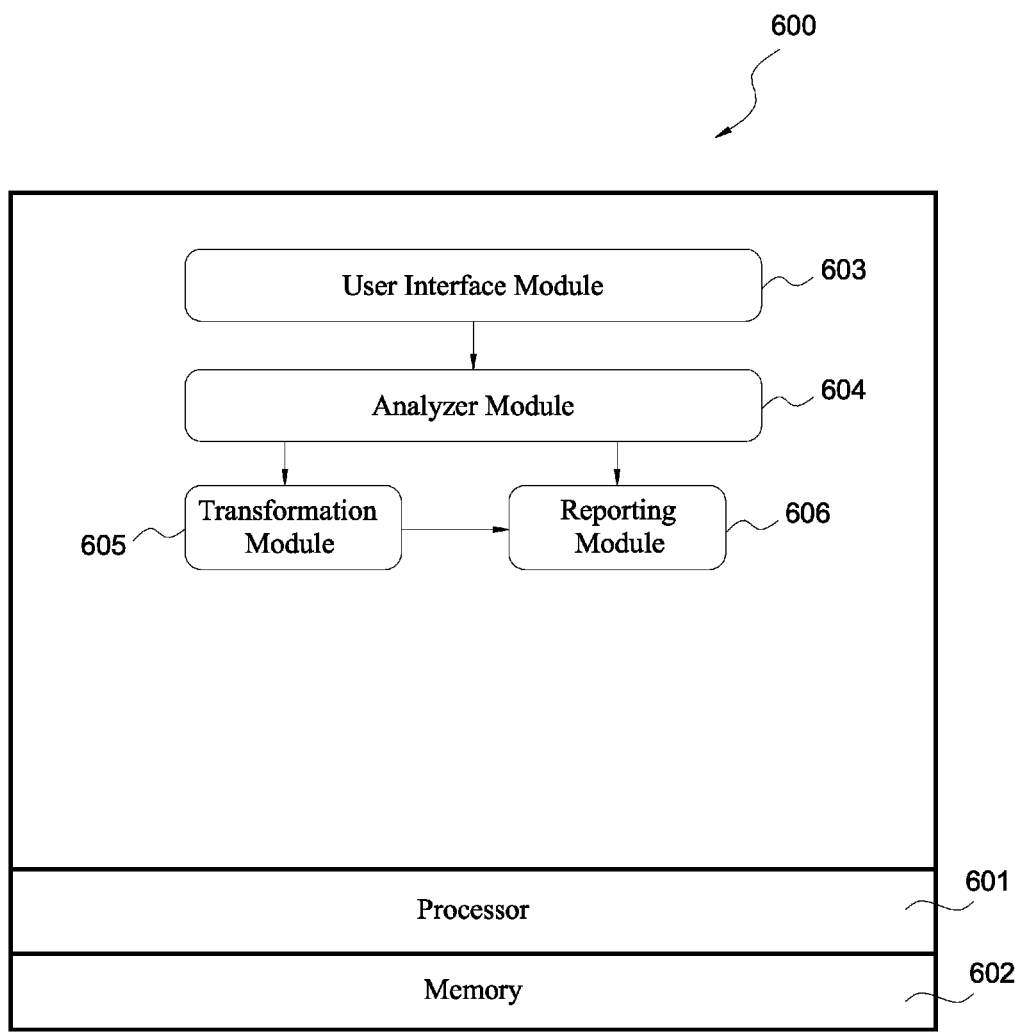
FIG. 6 is a schematic block diagram of an exemplary system that may include a computer with one or more modules.

Referring to FIG. 6, a further embodiment 600 may include a computer having at least a processor 601 and memory 602, a user interface module 603, an analyzer module 604 (which may include any aspects disclosed in the embodiments corresponding to 200, 300 and 400), a transformation module 605 configured to execute the transformation of the source code in the original format to a target system locale neutral format, as discussed above, and a reporting module 606 which may provide statistical reports based upon the success/fail rate of the transformation, the level of system locale neutral encoding support of the source code in the original format, the level of system locale neutral encoding support in the transformed source code and/or the image data produced by a image categorizer or analyzer.

The various modules consist of computer software code recorded on computer readable media and executed by a processor. The modules are segregated by function in this description for the purpose of clarity of description, but need not be discrete devices or code portions. The modules can be segregated or integrated in any manner. Various computer devices can be used to implement the embodiments, such as Servers, PCs, laptop computers, tablets, handheld computing devices, mobile devices or various combinations of such devices.

Application of the embodiments is not limited to the Unicode encoding context. Instead, as is appreciated by those skilled in the art, the disclosed embodiments may be applied to any encoding format either to any future internationalized format or to a native encoding format of a specific system locale. The embodiments described herein may be implemented via any appropriate computing environment, as understood by those skilled in the art. Further, the embodiments may interface with application managers, or other software and interfaces, hardware or any other appropriate means for providing source code in an original format, identifying a target encoding format or encoding locale or internationalized standard for encoding and receiving the transformed source code.

What is claimed is:

1. A computer system for analyzing and transforming computer source code, the system comprising:
    a memory, storing computer executable instructions; and
    a processor operatively coupled to said memory and configured to execute the instructions to perform the following steps:
        analyze at least one source code file that processes character text data in an original format to determine compliance with a target locale neutral encoding format, the target locale neutral encoding format being selected from a plurality of locale neutral encoding formats based on a first estimation of the source code file's compliance with at least one of the plurality of locale neutral encoding formats and a second estimation of encoding conversions required to achieve compliance with the at least one of the plurality of locale neutral encoding formats;
        and
        transform the source code into a transformed source code that is capable of processing character text data in the target locale encoding format.

2. The system of claim 1, wherein the target locale neutral encoding format is a Unicode format.

3. The system of claim 1, wherein the first and second estimation includes analysis of the at least one source code file's syntax for identifying APIs.

4. The system of claim 1, wherein the system receives from a user instructions to identify and transform the source code file.

5. The system of claim 1, wherein the system generates one or more reports indicating the results of the first and second estimation.

6. The system of claim 1, wherein the system generates one or more reports indicating the results of the image file analysis.

7. The system of claim 1, further comprising the step of:
analyzing image files referenced by the source code file, wherein text embedded in an image file is detected and flagged.

8. A non-transitory computer readable storage medium having stored thereon data representing sequences of instructions, which when executed by at least one computing device, cause the at least one computing device to:
analyze at least one source code file that processes character text data in an original format to determine compliance with a target locale neutral encoding format, the target locale neutral encoding format being selected from a plurality of locale neutral encoding formats based on a first estimation of the source code file's compliance with at least one of the plurality of locale neutral encoding formats and a second estimation of encoding conversions required to achieve compliance with the at least one of the plurality of locale neutral encoding formats;
and
transform the source code into a transformed source code that is capable of processing character text data in the target locale encoding format.

9. The computer readable medium of claim 8, wherein the target locale neutral encoding format is a Unicode format.

10. The computer readable medium of claim 8, wherein the first and second estimation includes analysis of the at least one source code file's syntax for identifying APIs.

11. The computer readable medium of claim 8, wherein the system receives from a user instructions to identify and transform the source code file.

12. The computer readable medium of claim 8, wherein the system generates one or more reports indicating the results of the first and second estimation.

13. The computer readable medium of claim 8, wherein the system generates one or more reports indicating the results of the image file analysis.

14. The computer readable medium of claim 8, further comprising the step of:
analyzing image files referenced by the source code file, wherein text embedded in an image file is detected and flagged.

15. A computer implemented method for transforming at least one source code file from an original format to a target locale neutral encoding format, comprising the steps of:
analyzing, by a computer, the at least one source code file, wherein the source code file processes character text data in an original format and is analyzed to determine compliance with the target locale neutral encoding format;
selecting, by a computer, the target locale neutral encoding format from a plurality of locale neutral encoding formats based on a first estimation of the source code file's compliance with at least one of the plurality of locale neutral encoding formats and a second estimation of encoding conversions required to achieve compliance with the at least one of the plurality of locale neutral encoding formats;
and
transforming, by a computer, the source code into a transformed source code that is capable of processing character text data in the target locale encoding format.

16. The computer-implemented method of claim 15, wherein the target locale neutral encoding format is a Unicode format.

17. The computer-implemented method of claim 15, wherein the first and second estimation includes an analysis, by a computer, of the at least one source code file's syntax for APIs.

18. The computer-implemented method of claim 15, further comprising the step of receiving, by a user interface, user instructions to identify and transform the source code file.

19. The computer-implemented method of claim 15, further comprising the step of generating, by a computer, one or more reports indicating the results of the first and second estimation.

20. The computer-implemented method of claim 15, further comprising the step of generating, by a computer, one or more reports indicating the results of the image file analysis.

21. The computer-implemented method of claim 15, further comprising the step of:
analyzing, by a computer, image files referenced by the source code file, wherein text embedded in an image file is detected and non-compliant text is flagged.

* * * * *